United States Patent [19]
Williamson et al.

[11] Patent Number: 5,621,751
[45] Date of Patent: Apr. 15, 1997

[54] CONTROLLING ELECTRODE GAP DURING VACUUM ARC REMELTING AT LOW MELTING CURRENT

[75] Inventors: Rodney L. Williamson, Albuquerque; Frank J. Zanner, Sandia Park, both of N.M.; Stephen M. Grose, Glenwood, W. Va.

[73] Assignee: Sandia Corporation, Albuquerque, N.M.

[21] Appl. No.: 426,532

[22] Filed: Apr. 21, 1995

[51] Int. Cl.⁶ .................................. H05B 7/148
[52] U.S. Cl. .................................. 373/70; 373/104
[58] Field of Search .................... 373/67, 68, 69, 373/70, 49, 50, 102, 104

[56] References Cited

U.S. PATENT DOCUMENTS

| | | | |
|---|---|---|---|
| 4,435,818 | 3/1984 | Stenzel et al. | 373/104 |
| 4,450,570 | 5/1984 | Weingartner et al. | 373/69 |
| 4,578,795 | 3/1986 | Fisher et al. | 373/70 |
| 4,881,239 | 11/1989 | Stenzel et al. | 373/70 |

*Primary Examiner*—Tu Hoang
*Attorney, Agent, or Firm*—George H. Libman

[57] ABSTRACT

An apparatus and method for controlling electrode gap in a vacuum arc remelting furnace, particularly at low melting currents. Spectrographic analysis is performed of the metal vapor plasma, from which estimates of electrode gap are derived.

17 Claims, 5 Drawing Sheets

CONTROLLING ELECTRODE GAP DURING VACUUM ARC REMELTING AT LOW MELTING CURRENT

GOVERNMENT RIGHTS

The Government has rights to this invention pursuant to Contract No. DE-AC04-76DP00789 awarded by the U.S. Department of Energy.

BACKGROUND OF THE INVENTION

1. Field of the Invention (Technical Field)

The invention relates to means and methods for monitoring and controlling the electrode gap distance during vacuum arc remelting of metallic alloys, particularly melting processes performed at low electrical current.

2. Background Art

Vacuum arc remelting (VAR) is a process used to control the solidification of segregation-sensitive alloys. The design and techniques of VAR have evolved to appreciable levels, as described in U.S. Pat. No. 4,450,570 to Weingartner et al., and patents referenced therein. Generally described, VAR is a process whereby a cylindrically shaped, alloy electrode is loaded into a water-cooled, copper crucible of a VAR furnace, the furnace is evacuated, and a dc electrical arc is struck between the electrode (cathode) and some start material (e.g., metal chips) at the bottom of the crucible (anode). The arc heats both the start material and the electrode tip, eventually melting both. As the electrode tip is melted away, molten metal drips from it and into the molten pool beneath, and the electrode is shortened. The crucible diameter must be somewhat larger than the electrode diameter. Consequently, the ever-shrinking electrode must be translated downwards toward the anode pool surface to keep constant the mean distance between the electrode tip and the pool. The mean distance from the electrode tip to the anode pool surface is called the electrode gap ($g_e$).

As the cooling water extracts heat from the crucible wall, the molten metal next to the wall solidifies. At some distance below the molten pool surface, the alloy becomes completely solidified, yielding a fully dense alloy ingot. After a sufficient period of time has elapsed, a steady-state situation evolves, consisting of a "bowl" of molten material situated on top of a fully solidified ingot base. As molten alloy solidifies, the ingot grows. The process, performed properly, produces ingots of high homogeneity.

Presently, VAR is the most commonly used melting process to produce ingots for many wrought alloy applications. VAR is particularly well-suited to melting nickel-based "superalloys" (such as Alloy 718) which contain substantial quantities of reactive elements, because melting is performed in a vacuum and the solidification environment can be controlled to the optimum. Among other things, the following improvements in VAR-produced ingots have been noted: (1) contained gases, especially hydrogen and oxygen, are reduced; (2) the alloy is cleaner (fewer non-metallic inclusions); (3) center porosity and segregation in the ingot are greatly reduced; and (4) mechanical properties of the remelted alloy, such as ductility and fatigue strength, are improved.

An important VAR process control parameter is electrode gap. Excessively wide gaps, especially, can be a cause of poor VAR performance, resulting in ingots of reduced quality. Conventional modern VAR controllers use drip-short frequency ($f_{DS}$) to control the width of the electrode gap. According to this method, as molten metal drips from the electrode surface, the hanging drop occasionally comes in contact with the anode pool before breaking away from the electrode. This causes the arc to momentarily "short", giving rise to a characteristic signature in the arc voltage trace. The number of these events that occur per second, $f_{DS}$, is a function of $g_e$, and this frequency data can be used to monitor and control the gap.

The reliability of the drip-short frequency method is substantially reduced, however, at reduced melting rates, due to the infrequency of drip shorts. At certain times during the VAR process, it may be desirable to reduce the melting rate (by reducing the electrode current) in order to enhance ingot quality. For this and other reasons, there is a need in the art for a means and method for controlling electrode gap width under conditions of reduced current.

SUMMARY OF THE INVENTION (DISCLOSURE OF THE INVENTION)

The present invention is of an apparatus and method of controlling electrode gap width in a vacuum arc remelting furnace, comprising: directing electromagnetic emissions from a metal vapor plasma within the furnace to a spectroscopic detector outside the furnace; spectroscopically analyzing the emissions; estimating an electrode gap width from the spectrographic analysis; and adjusting the electrode gap width based upon the estimate. In the preferred embodiment, the directing is accomplished by a combination of a fused silica window viewing port, a front-surfaced, aluminized mirror, a collimator, and a device for focusing the collimated electromagnetic emissions onto a fiber optic cable. The analyzing is preferably performed by: chopping the emissions at a chopping frequency; collimating the chopped emissions; splitting the collimated emissions into two or more portions; focusing each portion onto an input of a corresponding monochromator; detecting outputs of the monochromators using photo-multiplier tubes; feeding outputs of the photo-multiplier tubes to a lock-in amplifier detecting at the chopping frequency; and filtering and ratioing an output of the lock-in amplifier. Each of the monochromators may be set to one or more preselected wavelengths corresponding to emission lines of one or more desired ionic arc species. The estimating is preferably performed by solving $g_e=(R-w)/(x-yI-zP)$, where $g_e$ is the estimated electrode gap width, R is an intensity ratio, I is melting current, P is pressure, and w, x, y, and z are constants determined for a particular furnace and electrode material combination. The adjusting is preferably performed by altering the electrode feed velocity according to the following formula:

$$v(t+\tau) = v_o(t+\tau) + \frac{v}{2} \{\text{sign}[g_e^o - g_e(t)]\} \quad (1)$$

where $$v_o(t+\tau) = v_o(t) + \gamma v\{\text{sign}[g_e^o - g_e(t)]\} \quad (2)$$

and $v_o$ is the base feed velocity, v is the electrode feed (ram) velocity, $g_e^o$ is the set-point electrode gap, $\gamma$ is the gain, $v$ is the maximum allowable velocity change, t is time, and $\tau$ is the time increment between velocity adjustments.

A primary object of the present invention is to provide for accurate control of electrode gap during a vacuum arc remelt, particularly in that portion of the remelt performed at low melting currents.

A primary advantage of the present invention is that low melting current operations, such as hot-topping, can now be performed with a predictable and consistent electrode gap width.

Another advantage of the present invention is that existing furnaces may be easily retrofit to employ the system of the invention.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

Figure 1:
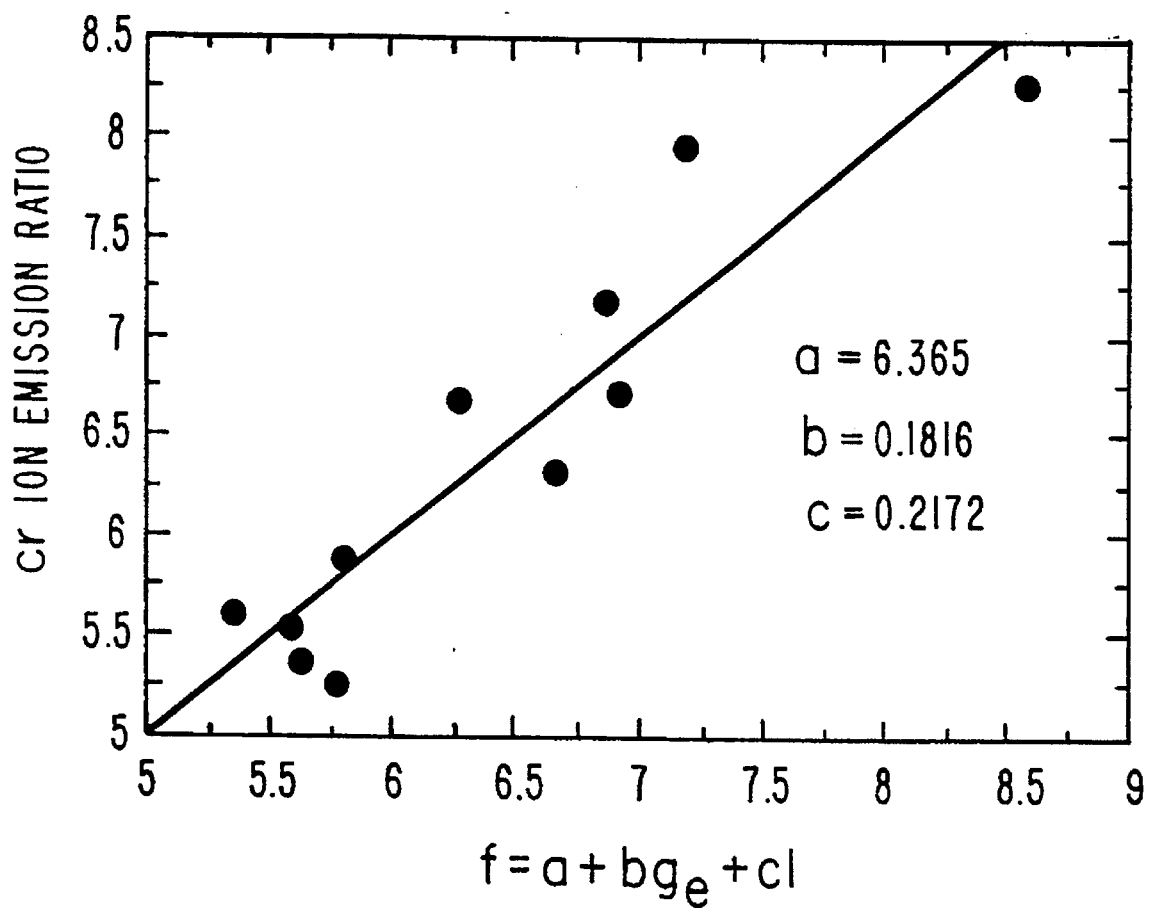
FIG. 1 is a graph of chromium ion emission line ratios, plotted a linear function of electrode gap and melting current, from data acquired during vacuum arc remelting of Alloy 718.

DESCRIPTION OF THE PREFERRED EMBODIMENT (BEST MODE FOR CARRYING OUT THE INVENTION)

Vacuum arc remelting is a melting and solidification process used to produce high quality ingots of chemically reactive or segregation sensitive alloys. The alloy is cast or forged into an electrode, and then remelted and solidified in a vacuum. A sustained high (several kiloamperes) direct current is used to induce an electrical arc between the electrode and a (normally water-cooled) conductive container or "crucible." Energy from the electrical arc melts the electrode (which, as mentioned, is cast from the alloy to be remelted) into the crucible. Thus, the dripping of molten electrode produces a pool of melted metal in the crucible. As the cooling water extracts heat from the crucible wall, the molten metal next to the wall solidifies. At a distance below the surface of the molten pool, the alloy becomes completely solidified, yielding a fully dense alloy ingot. After a sufficient period of time has elapsed, a steady-state situation evolves, consisting of a "bowl" of molten material situated on top of a fully solidified ingot base. As molten alloy solidifies, the solid ingot grows.

The success of the VAR process depends on, among other things, its ability to continually supply the advancing solidification region of the ingot with liquid metal while minimizing the local solidification time. If the solidification time becomes long—due to, e.g., a deep anode pool, resulting in a relatively low longitudinal thermal gradient—alloying elements will have time to segregate near the ingot center and the probability of undesirable macrosegregation will increase. Hence, it is necessary to control pool depth in segregation sensitive alloys. Considerations of process efficiency, however, recommend the maximization of the melt rate. Melt rate is maximized by manipulating arc current (the higher the current, the higher the melt rate). But high melt rates promote the formation of deeper molton alloy pools. Hence, the upper limit of melt rate is set by the segregation sensitivity of the alloy being processed.

A very important VAR process control parameter is electrode gap. If $g_e$ becomes too large, the arc may find less resistive paths to ground, such as arcing directly to the crucible wall from the lateral electrode surface. Such arcing significantly reduces process efficiency, since a smaller percentage of the current contributes to the melting of metal at the electrode tip and to the heating of the ingot. Large $g_e$ also contributes to arc constriction, i.e., attachment of the arc to a small region of the electrode tip. Arc constriction results in uneven melting of the tip and uneven heat input into the ingot, which in turn leads to a distortion of the symmetry of the solidification front. Distortions in the symmetry of the solidification front often produce solidification defects in the ingot. VAR arcs are often observed to switch back and forth between these two modes of operation when the gap is too large. Hence, it is important to precisely control $g_e$, such that melting and solidification conditions achieve and maintain a steady state with the arc evenly distributed across the electrode tip.

Modern VAR controllers commonly use drip-short frequency to regulate the electrode gap width. As melted metal drips from the electrode tip, the hanging molton drop sometimes contacts the anode pool surface before separating from the electrode. This contact causes the arc to momentarily "short", giving rise to a characteristic signature in the arc voltage trace. The number of these events that occur per second, $f_{DS}$, is a function of $g_e$. If a sufficient number of events (approximately 100) are counted to give a statistically meaningful average value, $f_{DS}$ may be used as control parameter to accurately predict and adjust electrode gap.

There are other considerations related to efficiently producing high quality VAR ingots. For example, the ratio of the electrode and ingot diameters (fill ratio) is important in determining the surface quality of the ingot. Also, near the end of the heat, it is desirable to reduce power and melt the remaining electrode stub at a reduced rate, giving rise to a progressively shallower pool as time elapses. This hot-topping process is aimed at minimizing the size of the shrinkage cavity, often called the "pipe," that forms in the end of the ingot and, hence, the amount of material that must later be cropped from the ingot and recycled.

Unfortunately, interruption of the steady-state conditions in the ingot during hot-topping enhances the probability of the alloy segregation, and it is important to carefully control the process under these conditions to maintain acceptable ingot chemistry. However, due to the fact that the melt rate is substantially reduced during hot-topping, drip-short frequency is small and control of the electrode gap by the drip-short data method is ineffective. Control schemes based on mean arc voltage are also ineffective, because arc voltage is relatively insensitive to $g_e$ at current levels below about 10 kA. Presently, there apparently is no method known in the art, upon which to base an electrode gap control scheme, for accurately predicting gap width during the low current conditions encountered in hot-topping procedures. This invention provides an accurate method of electrode gap control during VAR under low melting current conditions (e.g., hot-topping) where electrode gap control based on arc voltage or drip-short data is ineffective.

The dc electrical arc lies at the heart of the VAR process. Energy from the metal vapor arc plasma heats and melts the electrode tip, and heats the ingot surface, causing it to be molten. Thus, the temporal and spatial characteristics of the arc determine how heat and current are distributed across the electrode tip and molten ingot surface, determining the solidification behavior in the ingot and, consequently, the micro- and macro- structural properties of the alloy being processed. Present VAR control systems neither monitor nor attempt to manipulate the properties and character of the arc plasma.

The metal vapor plasma associated with the VAR process is very emissive. The metal vapor plasma produces intense light at wavelengths extending from the deep ultraviolet, through the visible, into the infra-red. The visible portion of this light is readily observed through a conventional furnace viewing port. When separated into its constituent wavelengths through the use of a dispersive device, such as a prism or grating spectrometer, the emitted energy produces a line spectrum that is unique to the alloy being processed. This light is produced in the plasma as a result of electronic relaxation of metal atoms and ions that have been excited through collisions with electrons. These relaxations are extremely fast, typically occurring on a time scale of $10^{-9}$ to $10^{-8}$ s. Hence, the plasma emissions have the ability to respond on a very abbreviated time scale to changing process conditions, particularly in comparison with common control signals such as furnace voltage or drip-short frequency.

The integrated area under an emission line for a particular arc species (e.g., chromium ions, Cr+, in an Alloy 718 arc) in a particular electronic energy state is proportional to the number density in the arc plasma of that species in that energy state. The proportionality constant is given by $g_n A_{nm}$, where $g_n$ is the degeneracy of state n and $A_{nm}$ is the emission probability coefficient (Einstein coefficient) describing the probability that the system will relax from electronic state n to state m through emission of a photon of energy $E_{nm}$. The ratio of two emission line areas from a particular arc species is, therefore, proportional to the population of that species in one energy state relative to the other energy state. Given that one energy state is higher than the other, this ratio will comprise an indicator of the electronic "temperature" of that arc species.

Strictly speaking, the term "temperature" only has meaning under conditions of thermodynamic equilibrium, or at least local thermodynamic equilibrium, where the energy distributions for the arc species conform to Boltzmann statistics. Such conditions are not met in the vacuum arc plasma, that is, the partitioning of energy in the plasma is not dominated by particle collisions. For this reason, the electron "temperature" does not equal the ion "temperature" which, in turn, does not equal the neutral atom "temperature". However, the individual ion and atom energy distributions in a VAR arc are Boltzmann-like, and a meaningful effective "temperature" for each arc species may be calculated.

Hence, the following relationship holds:

$$R = \frac{I_{nm}}{I_{pq}} = \frac{g_p A_{pq} \lambda_{nm}}{g_n A_{nm} \lambda_{pq}} \exp(-E_{np}/kT_{eff}) \quad (3)$$

I is understood to denote intensity and not arc current. As mentioned, the proportionality constant is given by $g_n A_{nm}$, $g_n$ is the degeneracy of state n, and $A_{nm}$ is the emission probability coefficient (Einstein coefficient) describing the probability that the system will relax from electronic state n to state m through emission of a photon of energy $E_{nm}$. Similarly, $g_p$ is the degeneracy of state p, and $A_{pq}$ is the emission probability coefficient (Einstein coefficient) describing the probability that the system will relax from electronic state p to state q through emission of a photon of energy $E_{pq}$. k is Boltzmann's constant. $I_{nm}$ is the spectral line intensity for the transition nm, and $I_{pq}$ is the spectral line intensity of the transition pq. Thus, fluctuations in the intensity ratio indicate fluctuations in the effective temperature, $T_{eff}$, for the arc species under investigation, which, in turn, is an indicator of arc condition. $\lambda_{nm}$ is the wavelength of the n→m transition.

Reference is made to FIG. 1, which illustrates that under low melting current condition, arc condition is sufficiently affected by electrode gap to be manifested as a detectable change in selected ion emission line ratios of the metal vapor species present in the arc. FIG. 1 is for chromium ion emission from data acquired during VAR of Alloy 718, a segregation sensitive nickelbase alloy containing approximately 18% chromium. The data were acquired by monitoring arc emissions from an industrial furnace while remelting a 0.431 m diameter electrode into a 0.508 m diameter ingot. During the VAR heat, melting current and electrode gap were varied over a factor space spanning current values from 5kA to 10kA and electrode gap values from 6 mm to 25 mm. The linear model that labels the abscissa in FIG. 1 accounts for about 86 percent of the variance in the data.

The invention uses conventional emission spectroscopic technology to acquire arc data that is used to accurately predict electrode gap under low melting current VAR conditions. A novel aspect of the invention is the application of the ion intensity ratio, acquired as described below, as the electrode gap control input.

Arc emissions are collected through the VAR furnace viewing port. To facilitate this, the viewing port glass window must be replaced with UV-grade fused silica to enable collection of ultra-violet emissions, and the window must be shielded from molten metal splatter from the arcing region. This shielding is accomplished with a pinhole aperture, as illustrated in FIG. 2.

Figure 2:
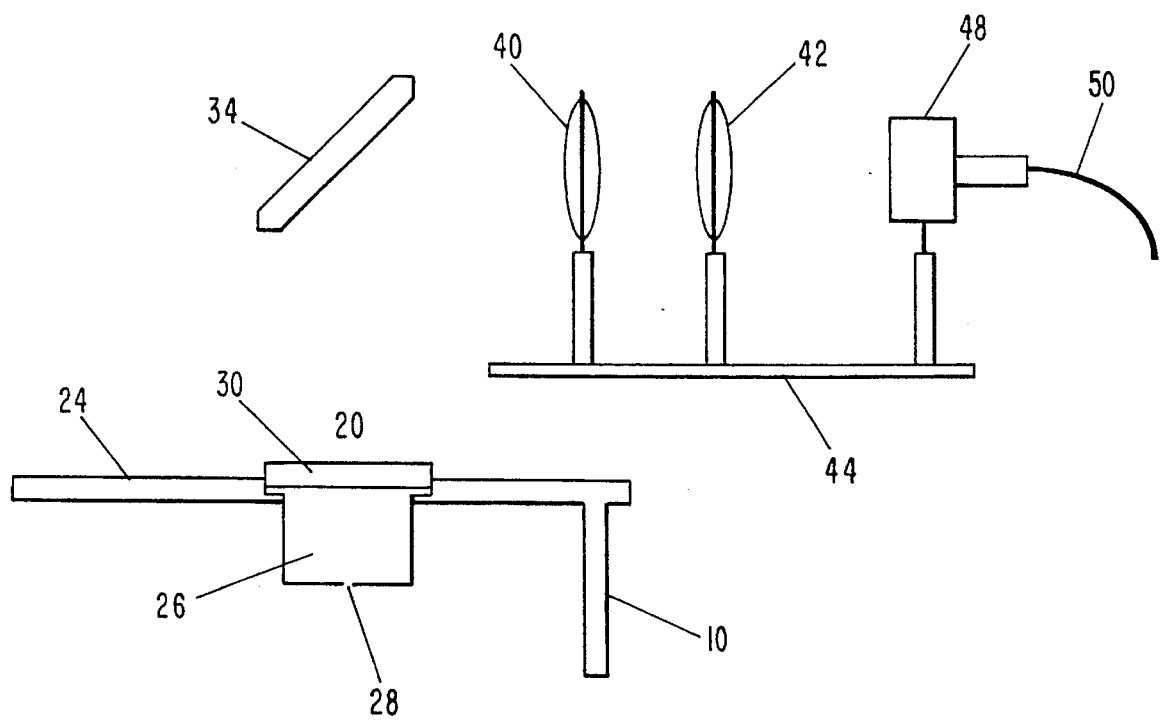
FIG. 2 is a side view of a viewing port apparatus for use in practicing the invention to obtain vacuum arc emissions data from within a vacuum arc remelting furnace.

FIG. 2 depicts how a typical line-of-sight viewing port on an industrial furnace may be modified for collection of arc emissions. The vacuum arc (not shown) is contained within the interior of the furnace body 10. Viewing port 20 is disposed in furnace top 24. Viewing port 20 is fitted with cup 26 having an aperture 28 therethrough, as shown in FIG. 2. Aperture 28 may be either a narrow slit, or, preferably a pinhole. The cup 26 is sealed against leakage from the furnace interior by a fused silica window 30. A front-surfaced, aluminized mirror 34 is disposed at an angle whereby emissions from the arc are reflected toward first lens 40. First lens 40 and second lens 42 are disposed upon an optics mounting plate 44. First lens 40 is positioned such that aperture 28 lies in its focal plane. Hence, first lens 40 collimates the light passing through aperture 28. Second lens 42 focuses the light onto the fiber optic cable 50 whose terminus is positioned (using optic cable mount 48) at the focal plane of second lens 42. Consequently, an image of the arc is positioned at the input of the fiber optic cable 50. An advantage of a pinhole configuration for aperture 28 is that a pinhole allows the image to remain in focus, regardless of the fact that the distance from the first lens 40 to the arc is constantly growing shorter as the ingot grows.

Figure 3:
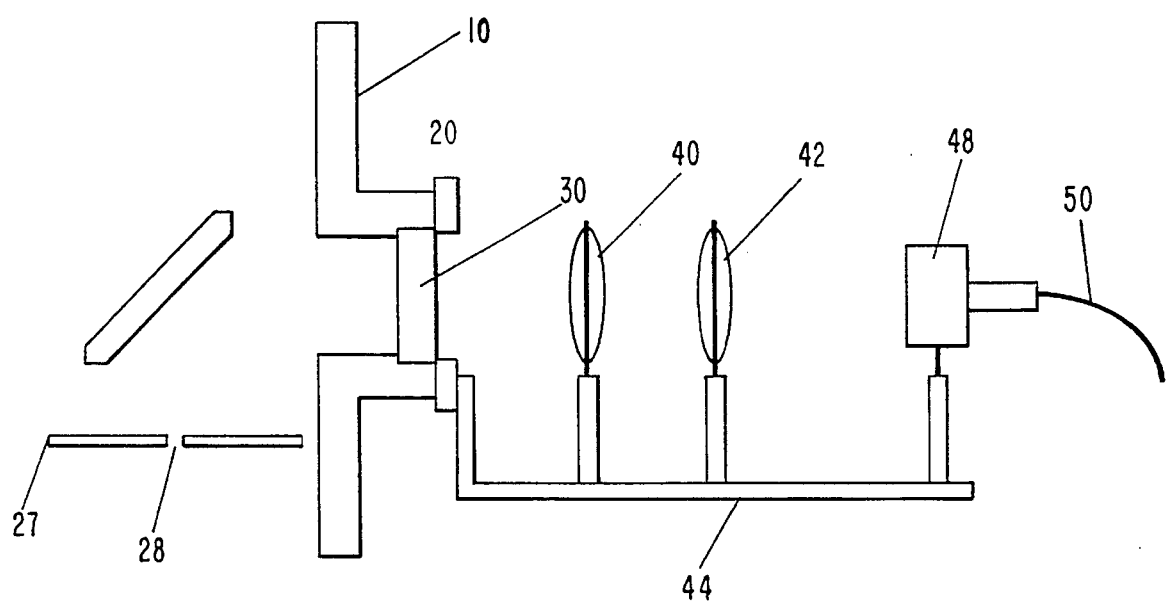
FIG. 3 is a side view of an alternative to the embodiment of FIG. 2.

Another common type of viewing port, the right-angle viewing port, may be modified as illustrated in FIG. 3.

Except that the mirror 34 is disposed within the interior of furnace body 10 instead of without, the modifications are substantially the same as set forth in FIG. 2. The FIG. 3 embodiment incorporates a metal shield plate 27, with aperture 28, within furnace body 10. Elements common to the embodiments of FIGS. 2 and 3 are identically labelled in the figures.

Figure 4:
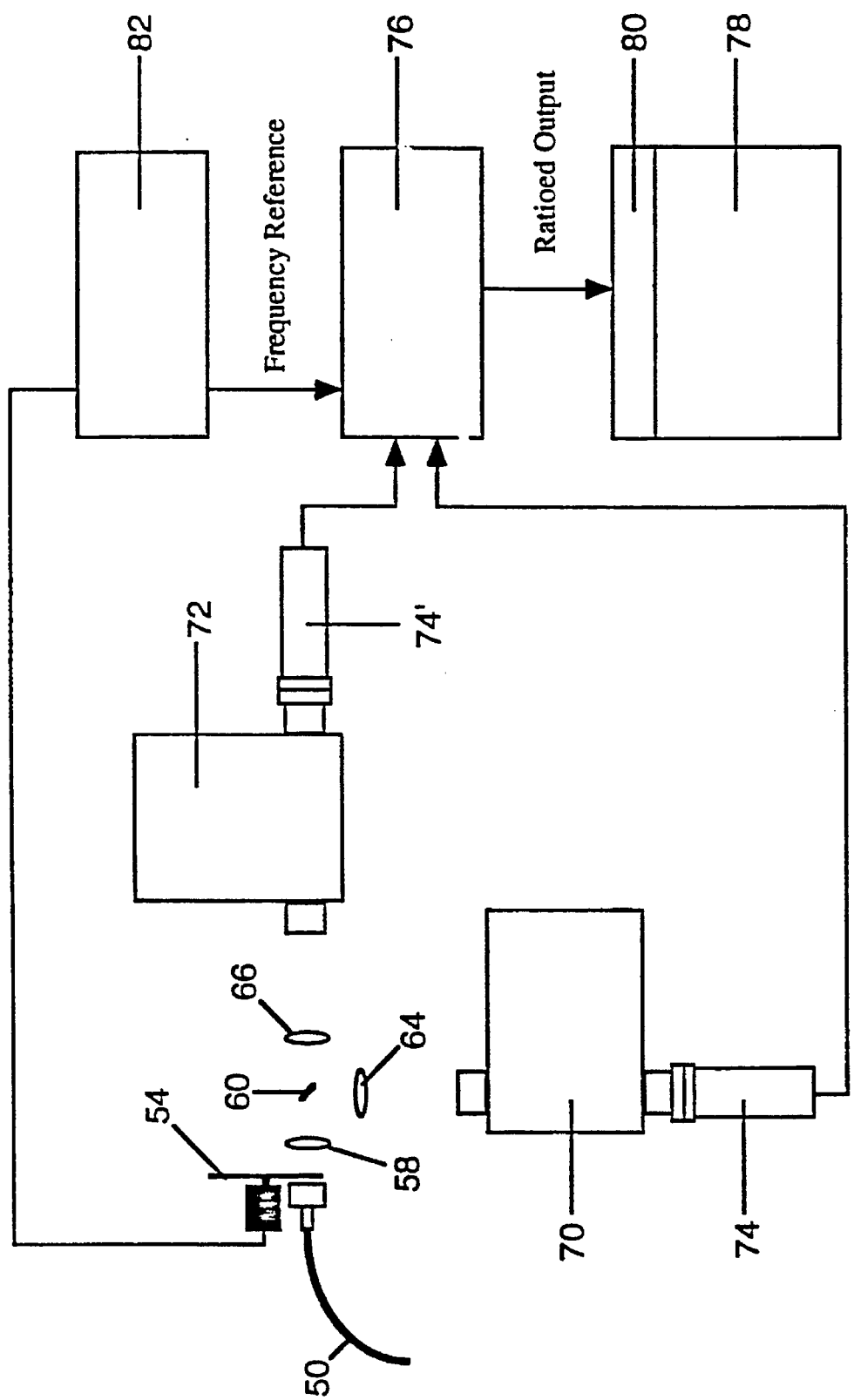
FIG. 4 is a schematic diagram of a spectroscopic data collection system for practicing the invention.

FIG. 4 shows a spectroscopic data collection system according to the invention. The beam exiting the fiber optic bundle is modulated by chopper 54 at a frequency other that 60 Hz or a multiple thereof, collimated by third lens 58, and split equally by a beam-splitter 60. Each beam is subsequently focused by focusing lenses 64,66 onto the input of one of two grating monochromators 70,72. Each monochromator 70,72 is set up to pass light of a particular, prespecified wavelength, corresponding to particular electronic transitions of the selected ionic arc species. (For example, in obtaining the data used to generate the curves shown in FIG. 1, chromium ion lines located at wavelengths of 284.3 nm and 281.8 nm were collected.) The light passed through each of the two monochromators 70,72 is detected using photomultiplier tubes (PMTs) 74,74'. The output of PMTs 74,74' is fed into the inputs of a two-channel lock-in amplifier 76 adjusted to detect at the chopping frequency (note the use of chopper control unit 82, which provides a frequency reference to amplifier 76), filtered appropriately, and then ratioed. The ratio output of the lock-in is proportional to the arc electrode gap.

The ratio output of the amplifier 76 is passed to a computer 78. The ratio data supplied by the data collection system must be translated into electrode gap data. This is accomplished using a small computer 78, such as a personal computer. Because the data is in analog form, computer 78 may access the data using a suitable analog-to-digital converter 80. Such devices are readily available from a number of manufacturers of computer hardware. To translate the ratio data into electrode gap data, a suitable algorithm has been developed. The data in FIG. 1 was derived using such an algorithm relating the intensity ratio, R, to melting current, I, and electrode gap, namely:

$$R = 6.365 + 0.1816 g_e - 0.2172 I. \qquad (4)$$

The constants in this equation are both material and furnace dependent, and must be found empirically for a give ratio. Using such an algorithm necessitates that melting current be available for periodic sampling by computer 78. Again, this is easily accomplished using current transducers available in most industrial melt shops coupled with readily available signal acquisition technology. It should be noted that Eq. 4 may contain higher order terms in both $g_e$ and I for some ratios.

The foregoing elements of this invention are implemented into a low current VAR electrode gap control system as follows.

Line ratio and melting current data are acquired and fed into the computer system as described above. Because the emission properties of the arc respond so rapidly to small perturbations, the line ratio information is averaged over an operator-specified period of time so that the system can respond to an average process state and not an instantaneous transient state. (The ratio data used to derive the graph in FIG. 1 were acquired using an averaging period of one second.) An appropriate algorithm (e.g., Eq. 4) is used to calculate a value for the electrode gap. The value is compared to an operator specified set-point. If the measured value is greater than the setpoint, the computer 78 sends an analog signal to the electrode feed controller (not shown) that increments the feed velocity to a higher value. If the measured electrode gap is smaller, the electrode velocity is decremented in a like manner. The process is then continually repeated, the electrode velocity being constantly adjusted to yield the correct average electrode gap.

It is important that the control system be sufficiently robust, i.e. that it not over-respond to fluctuations in the measured gap. In any system of this type, a certain level of noise in the measurements is to be expected. By the statistical nature of noise, random fluctuations in a measured property define a distribution of possible values (e.g. a Gaussian or bell-shaped distribution). Though most measured values fall in the vicinity of the mean, a certain probability exists for significantly larger fluctuations. A control system should not respond to such fluctuations in a proportional manner. To meet this requirement, one may use an adaptive bang-bang algorithm to make changes to electrode feed velocity. This algorithm has the form:

$$v(t+\tau) = v_o(t+\tau) + \frac{\upsilon}{2} \, \text{sign}[g_e^{\,o} - g_e(t)] \qquad (5)$$

where $$v_o(t+\tau) = v_o(t) + \gamma \upsilon \, \text{sign}[g_e^{\,o} - g_e(t)] \qquad (6)$$

and $V_0$ is the base feed velocity, v is the electrode feed velocity, $g_e^{\,0}$ is the setpoint electrode gap, $\gamma$ is the gain, $\upsilon$ is the maximum allowable velocity change, t is time, and $\tau$ is the time increment between velocity adjustments. Note that $v_0$ is estimated and entered in by the operator, but that as time passes this base velocity is "adapted" by the controller. Note also that $g_e^{\,0}$ does not have to remain fixed throughout the low current part of the process, but may be programmed to change as a function of time or melting condition. For example, as one enters into a hot-topping cycle and begins to cut back the melting current, one may wish to decrease the electrode gap as a function of the current cut back rate. This could be accomplished very easily by simply calculating the electrode gap as a function of measured current each time through the control loop. The dependence of the gap on the measured current would be derived and specified by the user as input to the control system. Obviously, other control schemes beside the bang-bang may be applied.

Industrial Applicability

The invention is further illustrated by the following non-limiting example.

Data were collected during a single heat while melting a 430 mm (17 inch) diameter Alloy 718 electrode into a 508 mm (20 inch) diameter ingot in a Consarc furnace. Current (I) was varied from 5 to 10 kA, electrode gap (G) from 6 to 51 mm, and pressure (P) from 10 to 100 μm. Furnace pressure was controlled through the addition of carbon monoxide. During the heat, two sub-trials were performed at each point in the factor space. Each sub-trial consisted of an approximately 10 minute period during which data were collected. The gap was checked at the beginning and end of each sub-trial.

During each sub-trial, arc voltage, current, pressure data and an absolute time signal were continuously acquired and stored on an analog tape recorder (Honeywell Model 101) for later play back and analysis. The bandpass of the tape recorder at the tape speed used (15 ips) was 10 kHz. Arc voltage was recorded directly onto the tape after being divided by a factor of 10. Arc current data were acquired from a Hall-effect transducer (Halmar Model 7ADM) mounted on a furnace bus bar. (This device uses the Hall effect to measure the magnetic field at a number of points in a closed path around the bus bar, yielding a highly accurate approximation to the total current passing through the bar according to Ampere's law. The output of this device is a voltage that is directly proportional to the current (10 mV/kA)). The transducer's signal was amplified and fed into one of the tape recorder inputs. Ambient furnace pressure was measured using a capacitance manometer type transducer (Baratron Model 227HS-A-1); the voltage output from this transducer is directly proportional to the pressure. Finally, an absolute time signal was recorded on the tape using a time code generator (Datum, Inc., Model 9300).

At the beginning and end of a trial, the electrode gap was checked. This was accomplished by manually driving the electrode down until a dead short caused the ram scram circuit to energize and rapidly withdraw the electrode. A computer (DEC LSI-II) was used to acquire data during the gap check. Arc voltage was read directly into the computer over an analog-to-digital converter (ADC). Simultaneously, ram position data were acquired using a linear displacement transducer (Temposonics II, MTS Systems Corp.). (This device outputs a 17 bit parallel signal that is read by the computer.) The gap was determined by noting the point on the ram position trace where the electrode touched the pool surface, as indicated by a rapid decrease in voltage. This position measurement was subtracted from the ram position measured before the gap check was started, the difference defining the electrode gap.

Furnace pressure was controlled using a flow controller (MKS Model 250B) and valve arrangement. Data from the pressure gauge were input to the flow controller. The controller used this data to compare actual pressure with a pre-specified set-point; it then operated the valve to achieve the set-point pressure.

Figure 5:
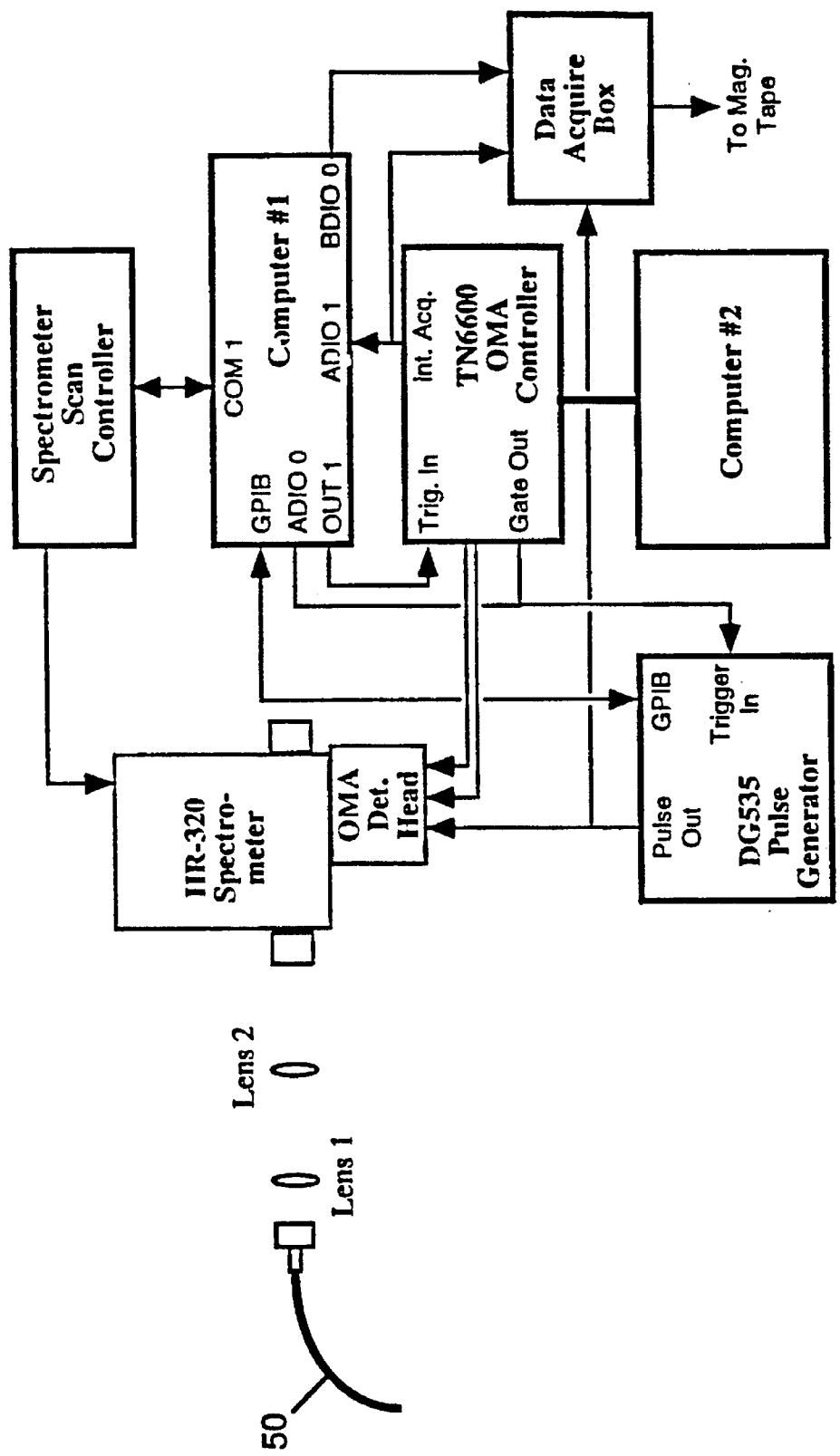
FIG. 5 is a schematic diagram of a spectrometer system employed in Example 1.

The example may by explained in part with reference to FIGS. 3 and 5. FIG. 3 is a representation of the viewing port modification and optics used in the furnace emission data collection. The stock mirror was replaced with a front surfaced, aluminized mirror 34, and the stock viewing port window was replaced with a window 30 constructed from UV-grade fused silica. These modifications were necessary to allow ultraviolet (UV) light to pass unattenuated out of the furnace; many ionic arc plasma species emit in the UV portion of the electromagnetic spectrum. Also shown in FIG. 3 is a metal shield plate 27, with a narrow aperture 28 therein. Plate 27 was used in place of the normal shield glass, which would quickly become coated with metal dust, film and splatter. The aperture 28 admits light while protecting mirror 34 from contamination. The collection optics were positioned so that aperture 28 lies in the focal plane. Hence, an image of the face of the optical cable 50 was focused onto the aperture 28. Light passing through the image was collected and transported via optical cable 50 to the spectrometer optics (e.g., FIG. 5). Optical cable 50 consisted of a bundle of UV grade fused silica fibers.

FIG. 5 aids in the description of the optical layout. A system was employed that focused the image of the optical cable 50 onto the input slit of a spectrometer system. The spectral content of the furnace arc emissions was investigated using this spectrometer. Inside the spectrometer the light was spectrally dispersed into its component wavelengths and focused onto the photodiode array of an optical multi-channel analyzer (OMA) detector head (not shown). (Once calibrated, the OMA system yields intensity versus wavelength data.) Each emitting arc species (e.g., Mn, Mn+, Cr, Cr+, etc.) has its own peculiar emission line spectrum. The integrated area under an emission line for a particular arc species is proportional to the number density of that particular excited state species.

Two computers (Compaq Model 386/25e) were used to control the experiment. Computer #1 was used for timing and spectrometer scanning chores, and was equipped with a data acquisition card (National Instruments Model AT-MIO-16L) and a IEEE-488 parallel interface card (National Instruments AT-GPIB). Computer #2 interfaced with the OMA controller (Tracor Northern Model TN6600) using hardware and software supplied by the OMA manufacturer. The OMA controller supplies power to the OMA detector head (Tracor Northern Model 6114), and contained all of the necessary electronics to set up and operate the OMA system. This was accomplished by user-supplied instructions from Computer #2. Computer #2 was also used to collect spectroscopic data from the controller buffer and store it to disk for subsequent processing. The controller supplied a GATE OUT signal for experiment synchronization. This signal was used to trigger a pulse generator (Stanford Research Model DG-535) that supplied a 5 volt pulse to the gating circuitry of the OMA detector head. The OMA controller determined the scan (read) cycle period of the head, whereas the length of the 5 volt gate pulse determined the acquisition time (exposure time). Acquisition times could be set as short as approximately $10^{-8}$s but no longer than the scan cycle period. The pulse generator was set up by Computer #1 over the IEEE-488 interface (GPIB). Computer #1 also supplied an operator-initiated trigger pulse on OUT 1 to the OMA controller to initiate data acquisition. Computer software insured that the pulse was delayed until the appropriate point in the scan cycle period as determined by the OMA controller GATE OUT signal, read into Computer #1 on ADIO 0. The user-designed and constructed Data Acquire Box was used to send signals to the analog tape to record times during which spectroscopic data were being acquired, allowing electrical, PMT, and spectroscopic data to be compared. Finally, the HR-320 (Instruments SA, Inc.) spectrometer wavelength was controlled using Computer #1 serially interfaced to the Spectralink controller (Instrument SA, Inc.).

Spectroscopic data at four different wavelengths were recorded during the second sub-trial of each point in the factor space. Spectra were acquired sequentially at wavelengths of 283.0, 303.0, 395.0 and 427.0 nm. At each wavelength, ten consecutive emission spectra were acquired with a typical exposure time of one second. Subsequent to such an acquisition the spectrometer wavelength was scanned to the next position and the process repeated until spectra had been acquired at all four wavelengths. The data were recorded on computer disk for later calibration and analysis.

The data were modeled using multiple regression analysis. As a general rule, the data were initially fit using I, G, P, and all second-order interaction terms (e.g. $I^2$, IG. etc.); the third-order interaction term IGP was also included. Models were produced using one of two procedures: the backward elimination (BE) procedure or the stepwise regression (SR) procedure. Some data were fit using log(I), log(P) and log(G) as the independent variables.

All regression analysis was carried out on a Macintosh IIx computer (Apple Computer Inc.) using StatView statistical software (BrainPower Inc.)

The data from which the model of this example was constructed are shown in Table I.

TABLE I

| TRIAL # | Cr+ ($I_{284.3}/I_{281.8}$) |
|---|---|
| 1B | 5.54 |
| 2B | 6.74 |
| 3B | 7.01 |
| 4B | 5.87 |
| 5B | 8.24 |
| 6B | 5.59 |
| 8B | 6.67 |
| 9B | 7.95 |
| 10B | 6.94 |
| 11B | 10.76 |
| 12B | 6.70 |
| 13B | 6.32 |
| 14B | 5.25 |
| 15B | 5.35 |
| 16B | 7.16 |
| 17B | 5.18 |

The response of the ratio may be modeled as:

$$R_{284/282}=4.49+0.248G-0.04G^2+0.003PG-3.853\times10^{-4}IPG\pm0.74 \quad (7)$$

This model was derived using BE. Eq. 5 accounts for only about 80% of the variance in the response.

The situation was improved significantly by considering only a subset of the data, namely that data acquired at electrode gaps less than 25 mm. When this is done, Eq. 4 is obtained. From analysis it is seen that Eq. 4 accounts for approximately 86% of the variance in its response. The model was derived using BE procedures.

Upon analysis, the model features two important aspects. First, the electrode gap alone accounted for approximately 75% of the variance in the response. Thus, the major driving force for the response of the $Cr^+$ "temperature" was the change in electrode gap; as the gap opened up, $T_{eff}$ decreases. The second significant feature is that the model is a good predictor only at electrode gaps below approximately 25 mm. When the large (>35 mm) electrode gap data were included, significant additional variance was introduced that could not be accounted for. The response appeared to be unstable at large gaps. Furthermore, if only the high pressure data were deleted from the data sets, the situation was not improved. Hence, within the factor space investigated, $P_{CO}$ does not play an important role in determining the ion "temperature" response. However, the significant feature of the model is that the ion "temperature" is primarily driven by electrode gap and the "temperature" falls as the gap is opened. As a reference number, if the uncertainty in the ion ratio response is taken to be equal to twice the standard error, the predicted uncertainty from the model of Eq. 4 is 2.4 mm. Hence, these data suggest that electrode gap may be predicted to within 5 millimeters if the ion "temperature" is accurately known and the gap is less that 25 mm.

Effective electronic ion temperature for $Cr^+$ was thus modeled, and it was determined that the response in $T_{eff}$ could be accurately modeled at electrode gaps less than approximately 25 mm with two parameters, the response being driven primarily by G. At longer gaps, significant variance is introduced into the response that cannot be adequately accounted for with less than six parameters. It was also determined that the response at small gap values is not sensitive to changes in pressure.

The response of the ratio of the light intensity at 284 nm to that at 282 nm could be modeled more accurately than the other ratios investigated. Eq. 4 shows the model for the response of this ratio. The modeling predicted an error of ±2.4 mm. Hence, the response in $T_{eff}$ appears to be a suitable electrode gap predictor in low current applications, such as might be found in hot-topping. Though the method used to collect the spectroscopic data and accurately calculate the ratios was rather involved and time consuming in the example, hardware could be constructed that was dedicated to directly acquiring the ratio of interest (see FIG. 4).

The preceding example can be repeated with similar success by substituting the generically or specifically described reactants, devices, and/or operating conditions of this invention for those used in the preceding examples.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above, are hereby incorporated by reference.

What is claimed is:

1. A method of controlling electrode gap width in a vacuum arc remelting furnace, the method comprising the steps of:
   a) directing electromagnetic emissions from a metal vapor plasma within the furnace to a spectroscopic detector outside the furnace;
   b) spectroscopically analyzing the emissions;
   c) determining a desired electrode gap width from the spectroscopic analysis; and
   d) adjusting the electrode gap width based upon the desired gap width.

2. The method of claim 1 wherein the directing step a) comprises providing to the furnace a viewing port comprising a fused silica window.

3. The method of claim 1 wherein the directing step a) comprises steering the electromagnetic emissions by a front-surfaced, aluminized mirror.

4. The method of claim 1 wherein the directing step a) comprises collimating the electromagnetic emissions and focusing them onto a fiber optic cable.

5. The method of claim 1 wherein the analyzing step b) comprises the steps of:
   a) chopping the emissions at a chopping frequency;
   b) collimating the chopped emissions;
   c) dividing the collimated emissions into more than one portions;
   d) focusing each portion onto an input of a corresponding monochromator;
   e) detecting outputs of the monochromators using photo-multiplier tubes;
   f) feeding outputs of the photo-multiplier tubes to a lock-in amplifier detecting at the chopping frequency; and
   g) filtering and ratioing an output of the lock-in amplifier.

6. The method of claim 5 additionally comprising the step of setting each of the monochromators to one or more preselected wavelengths corresponding to emission lines of one or more desired ionic arc species.

7. The method of claim 1 wherein the estimating step c) comprises solving $g_e=(R-w)/(x-yI-zP)$, where $g_e$ is the estimated electrode gap width, R is an intensity ratio, I is melting current, P is pressure, and w, x, y, and z are constants.

8. The method of claim 7 additionally comprising the step of empirically determining values of w, x, y, and z for a particular furnace and electrode material combination.

9. The method of claim 1 wherein the adjusting step d) comprises altering an electrode feed velocity according to the following formula:

$$v(t+\tau) = v_o(t+\tau) + \frac{v}{2} \{\text{sign}[g_e^o - g_e(t)]\}$$

where $$v_o(t+\tau) = v_o(t) + \gamma v \{\text{sign}[g_e^o - g_e(t)]\}$$

and $v_o$ is a base feed velocity, v is an electrode feed (ram) velocity, $g_e^o$ is a set-point electrode gap, $\gamma$ is a gain, $v$ is a maximum allowable velocity change, t is time, and $\tau$ is a time increment between velocity adjustments.

10. An apparatus for controlling electrode gap width in a vacuum arc remelting furnace, the apparatus comprising:

means for directing electromagnetic emissions from a metal vapor plasma within the furnace to a spectroscopic detector outside the furnace;

means for spectroscopically analyzing the emissions;

means for determining a desired electrode gap width from the spectroscopic analysis; and means for adjusting the electrode gap width based upon the desired gap width.

11. The apparatus of claim 10 wherein said directing means comprises a viewing port comprising a fused silica window.

12. The apparatus of claim 10 wherein said directing means comprises a front-surfaced, aluminized mirror.

13. The apparatus of claim 10 wherein said directing means comprises means for collimating the electromagnetic emissions and focusing them onto a fiber optic cable.

14. The apparatus of claim 10 wherein said analyzing means comprises:

means for chopping the emissions at a chopping frequency;

means for collimating the chopped emissions;

means for dividing the collimated emissions into more than one portions;

means for focusing each portion onto an input of a corresponding monochromator;

photo-multiplier tube means for detecting outputs of the monochromators;

means for feeding outputs of said photo-multiplier tube means to a lock-in amplifier detecting at the chopping frequency; and means for filtering and ratioing an output of the lock-in amplifier.

15. The apparatus of claim 14 additionally comprising means for setting each of the monochromators to one or more preselected wavelengths corresponding to emission lines of one or more desired ionic arc species of the plasma.

16. The apparatus of claim 10 wherein said estimating means comprises means for solving $g_e=(R-w)/(x-yI-zP)$, where $g_e$ is the estimated electrode gap width, R is an intensity ratio, I is melting current, P is pressure, and w, x, y, and z are constants.

17. The apparatus of claim 10 wherein said adjusting means comprises means for altering an electrode feed velocity according to the following formula:

$$v(t+\tau) = v_o(t+\tau) + \frac{v}{2} \{\text{sign}[g_e^o - g_e(t)]\}$$

where $$v_o(t+\tau) = v_o(t) + \gamma v \{\text{sign}[g_e^o - g_e(t)]\}$$

and $v_o$ is a base feed velocity, v is an electrode feed (ram) velocity, $g_e^o$ is a set-point electrode gap, $\gamma$ is a gain, $v$ is a maximum allowable velocity change, t is time, and $\tau$ is a time increment between velocity adjustments.

* * * * *